United States Patent [19]
Hicks et al.

[11] 4,069,614
[45] Jan. 24, 1978

[54] EARLY GROWTH ALTERATION TO INCREASE CORN GRAIN YIELD

[75] Inventors: Dale R. Hicks; R. Kent Crookston, both of St. Paul, Minn.

[73] Assignee: Regents of the University of Minnesota, Minneapolis, Minn.

[21] Appl. No.: 695,778

[22] Filed: June 14, 1976

[51] Int. Cl.$^2$ .............................................. A01G 1/00
[52] U.S. Cl. .......................................... 47/58; 71/93; 71/94; 71/97; 71/120
[58] Field of Search ................. 47/58, 1.44; 71/93–94, 71/97, 120

[56] References Cited
PUBLICATIONS

"The Effect of Injury . . . ," Eldredge, Iowa, Agr. & Home Econ. Exp. Sta. Res. Bul. 185, 1935.
"Effect of Defoliation . . . ," Russell, Ohio State, PhD, Thesis, 1967, Agronomy.
Agron. J., 66:270, (1974), Cloninger et al.

Primary Examiner—Robert E. Bagwill
Attorney, Agent, or Firm—Thomas M. Meshbesher

[57] ABSTRACT

Corn grain yield can be increased without affecting grain quality by alteration of early plant growth. One particularly preferred technique of early plant growth alteration involves reducing the effective leaf area of a short-season hybrid growing in a full-season maturity zone. With optimization of early plant growth alteration of an appropriate hybrid in an appropriate maturity zone, corn grain yield increases in excess of 30% and even in excess of 75% can be otained.

10 Claims, No Drawings

EARLY GROWTH ALTERATION TO INCREASE CORN GRAIN YIELD

FIELD OF THE INVENTION

This invention relates to a method for increasing corn grain yield.

DESCRIPTION OF THE PRIOR ART

Although the biology of corn plants (*Zea mays*, L.) is incompletely understood, a body of information is available regarding the various stages of growth of hybrid corn. For example, it is known that corn plant growth can include both vegetative and reproductive stages and that corn plants are initiated to flower by the night length in the growing zone. Prior to flowering, there are early stages of growth in which the only plant tissue appearing above ground is leaf tissue. On the other hand, several distinct stages can be noted after flowering, up to the appearance of the completely developed ear of corn.

In the case of field corn (e.g., dent corn), one of the most commonly occurring types of corn in the United States, a fairly typical demarkation of growth stages would be as follows: the leaf stages (LS), the appearance of a tassel, appearance of early milk, and the full dent stage.

Since the timing of the flowering of the corn plant is a function of the night length, which in turn can vary according to the geographical location of the growing zone, it is well known that hybrids can be selected for a given growing zone or maturity zone such that maturity can occur (with some limitations) at almost any point in the growing season for that zone. For example, if the farmer desires to have his harvest begin in the late summer and extend throughout the fall (rather than have the entire harvest period limited to late fall or early winter), he can select hybrids with different "relative maturity" ratings, so that — even if all the hybrids are planted at the same time — mature ears of corn will be available for harvesting at different times during the growing season. Not only does this technique of using hybrids with a plurality of relative maturities have the desirable effect of spreading out the work of the harvest period, it also can reduce drying costs. With the scarcity of energy becoming a significant problem for formers, it is desirable to obtain at least some ears of corn with a low moisture content earlier in the growing season. Unfortunately, the use of short-season hybrids usually involves an overall yield loss, which may or may not be compensated for by the saving in drying costs.

It is not always desirable to have simultaneously planted corn plants flower at different times. A substantial amount of research has been done to investigate the effects of altering the early growth of corn plants, with a view toward synchronizing the time that flowering occurs. Breeders and producers of hybrid corn sometimes find differing times of flowering to be inconvenient, and both flaming and clipping of corn plants have been used to obtain synchronization of flowering, e.g., simultaneous flowering of parental rows planted on the same date. At least some of these flowering synchronization studies have also looked at the effect upon corn grain yield. At the present time, it does not appear that any straightforward conclusions can be drawn from this published corn grain yield data, however.

Alteration of growth at an early stage in the development of corn plants can occur in nature through phenomena such as hail damage. Crop insurance companies, among others, have made extensive studies of the effect of hail damage on corn crops, but the data in this area of investigation also failed to provide clear guidelines which would enable those in the field of plant biology to predict effects upon corn grain yield resulting from such accidental alterations of early growth.

Several literature references could be cited to illustrate the findings of the various studies mentioned previously. The following references are believed to be representative:

Camery et al., "Effects of Certain Components of Simulated Hail Injury on Soybeans and Corn," Iowa Agr. and Home Econ. Exp. Sta. Res. Bul 400 (1953).

Cloninger et al., Agron. J. 66:270 (1974).

Dungan, J. Amer. Soc. Agron. 22:164 (1930).

Dungan et al, Agron. J. 43:90 (1951).

Eldredge, "The Effect of Injury in Limitation of Hail Damage on the Development of the Corn Plant," Iowa Agr. and Home Econ. Exp. Sta. Res. Bul., 185 (1935).

Green, Agron, J. 41:144 (1949).

Hanway, Agron. J. 61:534 (1969).

SUMMARY OF THE INVENTION

This invention relates to a method for reliably increasing corn grain yield by deliberately or intentionally altering the growth of the corn plant prior to stalk elongation. The stage of growth prior to stalk elongation can be selected to provide corn grain yield increases ranging from a few percent up to 75% or more. For example, yield increases in excess of 30% can be obtained with a variety of hybrids, particularly short-season hybrids grown in a full maturity zone. Although this invention is not bound by any theory, it is believed that the increase in corn grain yield is attributable to the inhibition (e.g., temporary interruption) of leaf function at the aforementioned early growth stage. The leaf function has, of course, several aspects, including transpiration, cooling of the plant, photosynthesis, respiration, and production of plant hormones such as auxins. Data obtained in accordance with this invention do not presently indicate with certainty which or how many of these aspects of leaf function should be inhibited; however, it is a relatively simple matter to inhibit all of the leaf function by reducing the effective leaf area, e.g., through mechanical removal of leaves or through the use of contact defoliants. Removal of extended leaf area from the plant can be either partial or complete, depending upon the nature of the plant, its stage of development, etc. One preferred stage of development is during initiation and early development of the reproductive primordia. Another way of defining preferred stages of development is in accordance with the number of leaves in the leaf stage (LS). As will be explained subsequently, the five leaf stage (five LS) is one of the optimum times for altering the growth of early-season hybrids growing in a full maturity zone.

DEFINITIONS

"Inhibition of leaf function," as noted previously, denotes an inhibition or slowing down or interruption (which interruption is temporary, viewed from the standpoint of the plant as a whole, rather than from the standpoint of an individual leaf) of any or all of the aspects of plant function, including cooling, transpiration, photosynthesis, respiration, auxin production, etc. Thus, "inhibition of leaf function" can include steps such as reduction of the effective leaf area.

The term "defoliators," as used herein, denotes the removal of only the extended portion of young leaves. The leaf blade tissue will thus normally be removed or rendered inoperative, and "defoliation" can include removal or chemical or thermal attack upon other leaf tissue (e.g., leaf sheaths) as well. Normally, the "defoliation" will concentrate on the leaf blade, and destruction or removal of leaf sheaths will be relatively incidental.

"Relative maturity" or "RM" refers to the genetic characteristic of the hybrid which determines flowering in response to a critical night length. Various systems for rating relative maturity are known, but in this application only the Minnesota Relative Maturity Rating System will be used. This rating system is described in Rinke et al, "Maturity Ratings for Corn Hybrids in Minnesota," 1961-1962, University of Minnesota Miscellaneous Report 20, Revised February 1961; see also R. H. Peterson and D. R. Hicks, "Minnesota Relative Maturity Rating of Corn Hybrids," University of Minnesota Agricultural Extension Service Fact Sheet, Agronomy Number 27-1973. As explained in this fact sheet, a geographic area can be divided into relative maturity zones and classifications. These zones constitute zones of adaptation. That is, a given genotype will flower and mature at a given time in that zone of adaptation, due to the night length in the zone.

"Short-season hybrid" refers to a corn (i.e., maize) hybrid with a "relative maturity" (RM) which is shorter than the growing season in the zone of adaptation or growing zone or maturity zone in which the hybrid is planted. For example, if the growing season in a given growing zone typically lasts until December, a "short-season hybrid" would be one which reaches a desired or optimum low kernel moisture content in, for example, October. A full-season hybrid, on the other hand, would have a higher moisture content than this desired or optimum level throughout the month of October. A typical moisture content used as a cut-off point for determining maturity is 30%, though lower percentages can be used.

The term "hybrid," as used herein, includes genotypes which are hybrids in the strict technical sense of the term; however, for convenience of description, the term is used to refer to other genotypes such as inbreds and open pollinated lines and other breeding lines of corn (*Zea mays* L.). Thus, for convenience, the terms "hybrid" and "corn line" are used synonymously.

DETAILED DESCRIPTION

As noted previously, a preferred means for altering growth prior to elongation of the stalk involves reducing the effective leaf area of the plant. Any means of reducing leaf area or defoliating can be used, provided that the ability of the plant to regrow is not hindered. Shredding or bruising of the remaining tissue should be avoided, since it could lead to leaf binding and thereby to uneven or seriously reduced growth. Several means of reducing leaf area or defoliation are known, including both mechanical and nonmechanical means. For the farmer, any mechanical means should be suited to simultaneous removal of leaves in several rows of plants. If the seed bed is flat, existing equipment (e.g., mowers) can do an adequate job of clipping off the top of the plant at an accurately determined height above the ground (e.g., a few inches) or at ground level. In other words, the mowing step can be arranged to either partially or fully defoliate the plants. In view of the increasing use of minimum tillage farming, it is desirable to modify conventional mowing equipment to provide the same accuracy of cuttong on seed beds which are nonplanar and/or full of irregularities. Other means of cutting plants include rapidly moving string cutters, razor blades, and the like.

Nonmechanical methods of reducing effective leaf area include flaming (crop burning devices can be mounted on tractors and the like) and the application of contact defoliants such as "Paraguat" (1,1'-dimethyl-4,4'-bipyridinium salt). Agents such as "Paraquat" actually kill vegetation on contact. A variety of other chemical compounds which kill vegetation are known, including dimethylarsinic acid ("Cacodylic acid"); dissodium methanearsonate; 3-(3,4-dichlorophenyl)-1-methoxy-1-methylurea ("Lorax"); 2-ethylamino-4-isopropyl-amino-6-methylmercapto-*s*-triazine ("Ametryene"); aqueous solutions of nitrogen compounds such as nitrates or ammonium salts; and carboxylic acids and derivatives thereof.

It is also known that the function of the leaf can be altered through the use of chemicals which have growth regulating, antitranspirant, or hormonal effects. For example, the function of a leaf can be effected by overwhelming it with hormones similar to those produced in the leaf tissue or in the roots of a plant. (Hormones produced by the roots of a plant, e.g., cytokinins, would have an anti-hormonal effect with respect to the leaves, if appropriately applied in appropriate plant systems.)

Leaf function abatement or inhibition effective for the purposes of this invention is that which takes place before elongation of the stalk, e.g., at or near the stage of reproductive primordia development within the plant. Although this invention is not bound by any theory, it is believed that, when growth-promoting substances formed in the root are concentrated around the growing point at the time of ear primordia initiation, a larger ear is formed and grain yield is improved. In accordance with this theory, removal of leaves increases the root to shoot ratio, thereby accentuating the effect of growth-promoting substances formed in the root. However, the invention is not believed to be limited to the complete removal of leaf tissue from the plant, and the general concept of this invention relates simply to inhibition of leaf function prior to stalk elongation. (Inhibition of leaf function may or may not involve an increase in the root to shoot ratio, depending on how the inhibition is achieved).

It is believed to be highly significant that the method of this invention involves growth alteration at an early stage of plant development. The leaf stage (LS) selected for growth alteration so as to optimize corn grain yield appears to be a function of the relative maturity (RM) of the hybrid.

As noted previously, corn plants are initiated to flower by the night length. When the night period is equal to or greater than a given length, the plant is induced to develop reproductive tissue (tassel and ears) rather than vegetative tissue (leaves). Plants differ in maturity since they differ genetically in their response to the night length. A full-season hybrid responds to the night length such that it requires and utilizes the entire growing season to progress through the plant life cycle (i.e., proceed from germination to seed development and maturation) whereas at the same geographical location a short-season hybrid is one which requires less than the entire growing season to complete its life cycle, because it is induced to flower earlier in the growing season compared to the full-season hybrid. Further, a full-season hybrid for a given geographical zone becomes a shorter-season hybrid when planted at more southerly locations (in the Northern Hemisphere). Conversely, a short-season hybrid at one location can become a full-season hybrid when it is planted at a more northerly location in the Northern Hemisphere. Thus, these terms are words of art for defining hybrid maturity and are relative measures for each corn growing location. The terms are meaningful to those skilled in the art when a corn growing location is specified (e.g., a "maturity zone" or "zone of adaptation" defined by the Minnesota Relative Maturity Rating System). In any event, the growing zone is the yardstock by which RM standards can be utilized and made meaningful for the purpose of selecting suitable hybrids for use in this invention.

Yield increases have been found to be consistently significant (e.g., 10% or more; with optimization, 30% or more) when the hybrid used is a short-season hybrid, i.e., a hybrid with a maturity that is relatively short as compared to the growing season of the zone in which it is to be planted. The exact biological explanation for the selection of short-season hybrids is not fully understood; furthermore, this invention is not bound by any theory. It is believed that when the short-season hybrid is planted in a growing zone with a relatively longer growing season, it develops reproductive primordia at an earlier development stage tha it would if grown in its area of adaptation (i.e., in the area in which the hybrid would be considered to be in the "full-seasons" category). Early development of primordia means that effective leaf area reduction can also be done early. As a result, the effect of leaf area reduction will then be less drastic in terms of loss of carbohydrate production for the season. The liklihood of more rapid regrowth will also be increased by the relatively early use of the leaf reduction step. If primordia development were to occur late in a plant's growing cycle (which happens for example when a full-season hybrid is planted in an area that has a shorter growing season) effective defoliation would have to be done at a relatively late stage, which might adversely affect regrowth and also result in unacceptable losses to the plant of carbohydrate.

Thus, when this invention is practiced with respect to relatively longer season hybrids, it becomes more and more important to inhibit leaf function by chemical means as opposed to a drastic mechanical defoliation.

In the preferred practice of this invention, wherein the effective leaf area of a short-season hybrid is reduced prior to stalk elongation, it presently appears that the precise nature of the hybrid is not critical, so long as the selected hybrid is relatively low in its RM rating. For example, in experiments conducted in the Southern Zone of Minnesota (as defined by the Minnesota Legislature in 1939 and revised in 1961), preferred hybrids would have a RM rating of less than 110 (e.g., 90 or less). In the Northern Zone of Minnesota, on the other hand, preferred hybrids would have a RM rating of less than 75. As is known in the art, hybrids have been developed in zones north of the 49th parallel (e.g., in Canada) which have extremely low (or "short") RM ratings.

For short-season hybrids grown within a full-season maturity zone, the presently preferred practice of this invention involves deliberate defoliation or a diliberate reduction in effective leaf area prior to the 13 leaf stages (13 LS), e.g., the five leaf stage (5 LS). For purposes of this invention, the leaf stage is determined by counting the lowermost leaf (the one with the rounded tip) as number one. The five leaf stage would be reached when, using this leaf counting system, leaf number five has developed to the point where the tip of the leaf points below a horizontal line.

UNITS USED IN THE EXAMPLE

The following Example, which illustrates the principle and practice of this invention, contains data expressed in metric agricultural units. A "quintal" (g) is 100,000 grams of 220.46 pounds. A hectare (ha) is 10,000 square meters or 2.47 acres. A hectoliter (hl) is 100 liters or 2.84 bushels. Yield data are expressed in g/ha.

EXAMPLE

An experiment comprising three tests was conducted to determined the effect of leaf blade removal on corn grain yield and other agronomic traits. Two dent corn hybrids, "Trojan TXS 85" [short-season hybrid with a relative maturity (RM) rating of 90, in accordance with the Minnesota Relative Maturity Rating System] and "DeKalb XL45A" [full-season hybrid with a relative maturity (RM) of 115, in accordance with the Minnesota Relative Maturity Rating System] were planted in each of the three tests prior to May 10 but after Apr. 25 in different growing seasons in Minnesota's Southern Zone of adaptation where a full-season hybrid is one with an RM of 110 or 115. For each test, plots were four 76-centimeters spaced rows in width and 7.6 meters in length with a plant stand of about 60,000 plants per hectare. Treatments imposed were (1) no leaf blade removal (control) and (2) complete leaf blade removal at the five leaf stage. Leaf blade removal was accomplished by cutting the plant below the collar of the second leaf and removing by pulling leaf number one. The portion removed was mainly leaf blade with some leaf sheath also being removed. The five leaf stage is defined as that stage of growth when leaf number five (counting the leaf with the rounded tip as number one) has developed such that the tip points below a horizontal line (i.e., is arched).

In each of the three tests, the center two rows were hand harvested in the first 10 days of October to determine grain yield, ear moisture content, kernel weight, test weight, and shelling percentage. Grain yields were adjusted to 15.5% moisture.

Relative to yields from plants on which leaf blades were not removed (control), grain yields of the full-season (115 RM) hybrid were reduced 7% (not statistically significant) by complete leaf blade removal at the five leaf stage while the three-test average yield was increased 48% by similar treatment of the short-season (90 RM) hybrid. See Table 1. The yield increases with the 90 RM hybrid were statistically significant at the 95% confidence level in each year and for the three-test average.

The 90 RM hybrid on which leaf blades were not removed (control) yielded an average of 79% of the 115 RM hybrid on which leaf blades were not removed (control). However, when the leaf blades were removed, as described above, at the five leaf stage the 90

RM hybrid yielded 16% more than the 115 RM hybrid on which leaf blades were not removed (control) (67.0 vs. 57.4 g/ha, three-test average).

When averaged over the three tests, removal of leaf blades did not significantly affect the harvest ear moisture content, kernel weight, or shelling percentage of the two hybrids. See Table 2. When averaged over the three tests, removal of leaf blades did not affect the test weight of the 90 RM hybrid but did cause a statistically significant lower test weight for the 115 RM hybrid. See Table 2.

Table 1

Effect of Leaf Blade Removal at the Five Leaf Stage of Grain Yield of Two Dent Corn Hybrids

| | Short-season Hybrid[1] | | | Full-season Hybrid[2] | | | |
|---|---|---|---|---|---|---|---|
| Test | Control q/ha[3] | Leaf Blades Removed g/ha | % Increase | Control q/ha | Leaf Blades Removed q/ha | % Increase | q/ha |
| No. 1 | 47.9 | 76.1 | 58.9 | 68.8 | 65.5 | −5.0 | 10.8 |
| No. 2 | 21.5 | 38.8 | 79.9 | 31.5 | 30.5 | −3.2 | 8.8 |
| No. 3 | 66.1 | 86.0 | 30.3 | 72.0 | 61.9 | −14.0 | 15.3 |
| Average | 45.2 | 67.0 | 56.4* | 57.4 | 52.6 | −7.4** | 11.0 |

*Three-test average yield increase of 48.2%
**Three-test average yield increase of −8.0%
[1]"Trojan TXS 85", a hybrid with a relative maturity rating of 90, in accordance with the Minnesota Relative Maturity Rating System.
[2]"DeKalb XL45A", a hybrid with a relative maturity rating of 115, in accordance with the Minnesota Relative Maturity Rating System.
[3]Quintals per hectare.
[4]Least Significant Difference at a level of 95% confidence (the minimum difference between control and leaf blades removed which is statistically significant at a level of 95% confidence).

Table 2

Effect of Leaf Blade Removal at the Five Leaf Stage on Harvest Ear Moisture Content, Test Weight, Kernel Weight, and Shelling Percentage of Two Dent Corn Hybrids

| | Short-season Hybrid[1] | | Full-season Hybrid[2] | | |
|---|---|---|---|---|---|
| Trait | Non-Defoliated | Defoliated | Non-Defoliated | Defoliated | LSD[3] |
| Ear Moisture at Harvest (%) | 13.6 | 13.6 | 24.6 | 27.9 | 2.4 |
| Test Weight (kg/hl) | 75.8 | 76.8 | 73.0 | 70.7 | 2.1 |
| 100 Kernel Weight (g) | 22.2 | 22.0 | 18.8 | 19.5 | 2.4 |
| Shelling Percentage | 85.7 | 85.4 | 85.8 | 84.8 | 1.3 |

[1]"Trojan TXS85", a hybrid with a relative maturity (RM) rating of 90, in accordance with the Minnesota Relative Maturity Rating System.
[2]"DeKalb XL45A", a hybrid with a relative maturity (RM) rating of 115 in accordance with the Minnesota Relative Maturity Rating System.
[3]Least Significant Difference at a level of 95% confidence.

These test data indicate that the farmer, utilizing the principles of this invention, can obtain the benefits of a short-season corn plant life cycle (e.g., the energy-saving benefit of less artificial drying due to low kernel moisture content) without the usual sacrifice in yield; with optimization of the timing of defoliation, the farmer can actually obtain more yield with a short-season hybrid treated according to this invention than he can with an untreated full-season hybrid.

What is claimed is:

1. A method for increasing the grain yield of genotypes of *Zea mays*, the flowering of which is responsive to the night length in the growing zone, comprising the steps of:
    a. growing a relatively short-season corn line in a relatively longer-season growing zone, which corn line is a said genotype, to obtain short-season corn plants with extended leaves;
    b. deliberately inhibiting leaf function of at least some of the extended leaves of said short-season corn plants, said deliberately inhibiting step being commenced prior to stalk elongation and about in the period of initiation and development of the reproductive primordia.

2. A method according to claim 1 wherein said leaf function is inhibited by reducing the effective leaf area.

3. A method according to claim 2 wherein said reducing step is carried out by means of mechanical defoliation.

4. A method according to claim 2 wherein said deliberately inhibiting step is carried out prior to the 13 leaf stage of growth of said short-season corn plants.

5. A method according to claim 1 wherein the short-season corn line is a field corn.

6. A method according to claim 1 wherein said leaf function is deliberately inhibited generally during initiation of the reproductive primordia.

7. A method according to claim 1 wherein said deliberately inhibiting step is commenced during development of the reproductive primordia and prior to the 13 leaf stage.

8. A method according to claim 1 wherein said corn line is a field corn, and said inhibiting comprises defoliation prior to the 13 leaf stage 9. In a method for treating relatively short-season corn (*Zea mays*) plants with extended leaves growing in a relatively longer-season zone of adaptation, the flowering of said corn plants being responsive to the night length in the growing zone, the improvement which comprises:
    deliberately inhibiting leaf function of said plants, prior to the thirteen leaf stage, while the reproductive tissue of said plants is still in a primordial stage.

10. A method for increasing grain yield of a *Zea mays* corn line, the flowering of which is responsive to the night length in the growing zone, comprising the steps of:
    a. growing a said corn line to obtain corn plants with extended leaves;
    b. deliberately inhibiting leaf of function of at least one of the extended leaves of said corn plants with a chemical leaf function inhibiting means prior to stalk elongation while the reproductive tissue of said corn plants is still in a primordial stage.

* * * * *

UNITED STATES PATENT AND TRADEMARK OFFICE
CERTIFICATE OF CORRECTION

PATENT NO. : 4,069,614

DATED : January 24, 1978

INVENTOR(S) : Dale R. Hicks and R. Kent Crookston

It is certified that error appears in the above-identified patent and that said Letters Patent are hereby corrected as shown below:

In column 1, line 47, for "formers" read --farmers--.
In column 2, line 16, for "Bul 400" read --Bul. 400--.
In column 3, line 5, for "defoliators" read --defoliation--.
In column 4, line 6, for "cuttong" read --cutting--.
In column 4, line 13, for "Paraguat" read --Paraquat--.
In column 4, line 14, for "4,4'-bipyridinium" read
      --4,4'bipyridinium--.
In column 4, lines 17 and 18, for "dissodium" read
      --disodium--.
In column 4, line 19, for "("Lorax")" read --("Lorox")--.
In column 5, line 19, "yardstock" should read -- yardstick --.
In column 5, line 33, for "tha" read --than--.
In column 6, line 16, for "(g)" read --(q)--.
In column 6, line 20, for "g/ha" read --q/ha--.
In column 6, line 23, for "determined" read --determine--.
In column 7, line 3, for "g/ha" read --q/ha--.
In column 7, line 14, for "Stage of Grain" read --Stage on
      Grain--.
In column 7, line 18, last column should have title
      --LSD4--.
In column 7, line 19, for "g/ha" read --q/ha--.

UNITED STATES PATENT AND TRADEMARK OFFICE
CERTIFICATE OF CORRECTION

PATENT NO. : 4,069,614
DATED : January 24, 1978
INVENTOR(S) : Dale R. Hicks and R. Kent Crookston It is certified that error appears in the above-identified patent and that said Letters Patent are hereby corrected as shown below:

In column 7, line 58, for "mor e" read --more--.
In column 8, line 53, for "leaf of function" read --leaf function--.
In column 8, line 54, for "one" read --some--.

Signed and Sealed this

Tenth Day of October 1978

[SEAL]

Attest:

RUTH C. MASON
Attesting Officer

DONALD W. BANNER
Commissioner of Patents and Trademarks